United States Patent
Nautiyal et al.

(10) Patent No.: US 11,334,409 B2
(45) Date of Patent: May 17, 2022

(54) METHOD AND SYSTEM FOR FAULT COLLECTION AND REACTION IN SYSTEM-ON-CHIP

(71) Applicant: NXP USA, Inc., Austin, TX (US)

(72) Inventors: Hemant Nautiyal, Noida (IN); Jehoda Refaeli, Austin, TX (US); Ankush Sethi, Austin, TX (US); Shreya Singh, Ranchi (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/003,457

(22) Filed: Aug. 26, 2020

(65) Prior Publication Data

US 2021/0397502 A1 Dec. 23, 2021

(30) Foreign Application Priority Data

Jun. 18, 2020 (IN) .............................. 202021025656

(51) Int. Cl.
*G06F 11/07* (2006.01)
(52) U.S. Cl.
CPC ...... *G06F 11/0724* (2013.01); *G06F 11/0775* (2013.01); *G06F 11/0793* (2013.01)

(58) Field of Classification Search
CPC ............. G06F 11/0724; G06F 11/0775; G06F 11/079; G06F 11/0793
See application file for complete search history.

(56) References Cited

U.S. PATENT DOCUMENTS

| | | |
|---|---|---|
| 7,252,180 B2 | 8/2007 | Deplazes et al. |
| 2017/0083391 A1 | 3/2017 | Robertson et al. |
| 2018/0105183 A1* | 4/2018 | Kollmer ............. G06F 11/0739 |

* cited by examiner

*Primary Examiner* — Joseph R Kudirka

(57) ABSTRACT

A fault collection and reaction system on a system-on-chip (SoC) includes a plurality of reaction cores assigned to a plurality of applications being executed by a plurality of processor cores on the SoC, at least one look-up table (LUT), and a controller. The at least one LUT stores therein a first mapping between the plurality of reaction cores and corresponding plurality of domain identifiers, and a second mapping between a plurality of faults and a set of reaction combinations. The controller receives a fault indication and a first domain identifier in response to occurrence of a first fault and selects from the plurality of reaction cores, a first reaction core mapped to the first domain identifier, and from the set of reaction combinations, a first reaction combination mapped to the first fault. The first reaction core responds to the fault indication with a reaction based on the selected reaction combination.

20 Claims, 7 Drawing Sheets

METHOD AND SYSTEM FOR FAULT COLLECTION AND REACTION IN SYSTEM-ON-CHIP

BACKGROUND

The present disclosure relates generally to management of faults in system-on-chips (SoCs), and, more particularly, to method and system for fault collection and reaction in SoCs.

Increasing level of system integration has resulted in more and more processor cores and resources being bundled on a single chip. These processor cores have multiple applications being executed at the same time. Such system designs with multiple applications integrated on the same chip and working concurrently, increase the number of faults in the chip. To achieve fault-free operation, it is mandatory to detect and recover from a fault within fault handling time interval. Typically, a fault collection and reaction system is included on the chip to categorize faults and generate appropriate reactions.

Existing fault collection and reaction system architectures have an application independent fault collection and reaction approach, which results in a high severity response for each fault irrespective of the application that resulted in the fault. Moreover, the existing fault collection and reaction systems rely on a central core and software to handle faults from all applications. This increases fault handling time and instability in the chip and reduces system availability for other operations. In light of the foregoing, it would be advantageous to have an application dependent fault collection and reaction system.

SUMMARY

In one embodiment, a system-on-chip (SoC) is disclosed. The SoC includes a plurality of processor cores configured to execute a plurality of applications. The SoC further includes a fault collection and reaction system coupled to the plurality of processor cores. The fault collection and reaction system includes a plurality of reaction cores each assigned to at least one of the plurality of applications. The fault collection and reaction system further includes at least one look-up-table (LUT) configured to store a first mapping between the plurality of reaction cores and corresponding plurality of domain identifiers, and a second mapping between a plurality of faults associated with the plurality of applications and a set of reaction combinations. The fault collection and reaction system further includes a controller coupled to the plurality of reaction cores and the at least one LUT. The controller is configured to receive a fault indication and a first domain identifier of the plurality of domain identifiers in response to occurrence of a first fault associated with a first application of the plurality of applications. The controller is further configured to select from the plurality of reaction cores, a first reaction core mapped to the first domain identifier in the at least one LUT, and from the set of reaction combinations, a first reaction combination mapped to the first fault in the at least one LUT. The selected first reaction core is configured to respond to the fault indication with a reaction based on the selected reaction combination.

In another embodiment, a fault collection and reaction method for an SoC is disclosed. The fault collection and reaction method includes storing, by at least one look-up table (LUT) of a fault collection and reaction system on the SoC, a first mapping between a plurality of reaction cores of the fault collection and reaction system and corresponding plurality of domain identifiers, and a second mapping between a plurality of faults and a set of reaction combinations. The plurality of faults are associated with a plurality of applications executed by a plurality of processor cores on the SoC and each of the plurality of reaction cores is assigned to at least one of the plurality of applications. The fault collection and reaction method further includes receiving, by a controller of the fault collection and reaction system, a fault indication and a first domain identifier of the plurality of domain identifiers in response to occurrence of a first fault associated with a first application of the plurality of applications. The fault collection and reaction method further includes selecting, by the controller, from the plurality of reaction cores, a first reaction core mapped to the first domain identifier in the at least one LUT, and from the set of reaction combinations, a first reaction combination mapped to the first fault in the at least one LUT. The fault collection and reaction method further includes responding, by the selected first reaction core, to the fault indication with a reaction based on the selected first reaction combination.

In another embodiment, a fault collection and reaction system for an SoC is disclosed. The SoC includes a plurality of processor cores coupled to the fault collection and reaction system. The fault collection and reaction system includes a plurality of reaction cores each assigned to at least one of the plurality of applications. The fault collection and reaction system further includes at least one look-up-table (LUT) configured to store a first mapping between the plurality of reaction cores and corresponding plurality of domain identifiers, and a second mapping between a plurality of faults associated with the plurality of applications and a set of reaction combinations. The fault collection and reaction system further includes a controller coupled to the plurality of reaction cores and the at least one LUT. The controller is configured to receive a fault indication and a first domain identifier of the plurality of domain identifiers in response to occurrence of a first fault that is associated with a first application of the plurality of applications. The controller is further configured to select from the plurality of reaction cores, a first reaction core mapped to the first domain identifier in the at least one LUT, and from the set of reaction combinations, a first reaction combination mapped to the first fault in the at least one LUT. The selected first reaction core is configured to respond to the fault indication with a reaction based on the selected reaction combination.

In some examples, the SoC further includes at least one resource coupled to the fault collection and reaction system and the plurality of processor cores. The execution of the plurality of applications includes a plurality of transactions between the at least one resource and the plurality of processor cores. The first fault occurs based on at least one of a failure of a first transaction associated with the first application and a failure of an operation of the at least one resource subsequent to the first transaction.

In some examples, the first reaction core includes a set of immediate reaction LUTs. Each of the set of immediate reaction LUTs is configured to store therein an immediate reaction configuration corresponding to one of the plurality of faults. The first reaction core further includes a set of delayed reaction LUTs. Each of the set of delayed reaction LUTs is configured to store therein a delayed reaction configuration corresponding to one of the plurality of faults.

In some examples, the controller is further configured to generate a first selection signal to indicate the selection of the first reaction core and provide the first selection signal to the plurality of reaction cores. Based on the first selection signal, the first reaction core assigned to the first application and mapped to the first domain identifier is selected from the plurality of reaction cores to respond to the fault indication. The controller is further configured to generate a second selection signal to indicate the selection of the first reaction combination and provide the second selection signal to the selected first reaction core. The controller is further configured to generate a start signal based on the received fault indication, and a reset signal when the first fault is handled.

In some examples, the set of immediate reaction LUTs and the set of delayed reaction LUTs are further configured to receive the second selection signal. Based on the second selection signal, a first immediate reaction LUT and a first delayed reaction LUT corresponding to the first reaction combination are selected from the set of immediate reaction LUTs and the set of delayed reaction LUTs, respectively, to respond to the fault indication.

In some examples, the fault collection and reaction system further includes a timer coupled to the controller and the plurality of reaction cores. The timer is configured to receive the start signal from the controller and run based on a timer value indicated by the start signal. The timer is further configured to generate a time-out signal. The time-out signal transitions from a first logic state to a second logic state when the timer times out. The set of delayed reaction LUTs is further configured to receive the time-out signal. The first delayed reaction LUT selected based on the second selection signal is disabled when the time-out signal is at the first logic state and enabled when the time-out signal is at the second logic state. When the time-out signal is at the first logic state, the first immediate reaction LUT is configured to output the reaction based on a first immediate reaction configuration stored therein. When the time-out signal is at the second logic state, the first delayed reaction LUT is configured to output the reaction based on a first delayed reaction configuration stored therein. The timer is further configured to receive the reset signal from the controller when the first fault is handled and reset to a default state based on the reset signal.

Various embodiments of the present disclosure disclose a fault collection and reaction system for a system-on-chip (SoC). The SoC includes a plurality of processor cores that are configured to execute a plurality of applications and at least one resource coupled to the plurality of processor cores. The fault collection and reaction system includes a plurality of reaction cores, first and second look-up tables (LUTs), and a controller. Each reaction core is assigned to at least one of the plurality of applications. The first LUT is configured to store therein a first mapping between the plurality of reaction cores and corresponding plurality of domain identifiers, and the second LUT is configured to store therein a second mapping between a plurality of faults associated with the plurality of applications and a set of reaction combinations. In response to occurrence of a first fault of the plurality of faults on the SoC, the controller is configured to receive a fault indication and a first domain identifier of the plurality of domain identifiers. The first domain identifier is indicative of a first application of the plurality of applications that is associated with the first fault. The controller is further configured to select from the plurality of reaction cores, a first reaction core that is mapped to the first domain identifier in the first LUT, and from the set of reaction combinations, a first reaction combination mapped to the first fault in the second LUT. The selected first reaction core is configured to respond to the fault indication with a reaction based on the selected reaction combination.

Instead of relying on a single central core for responding to fault indications, the fault collection and reaction system of the present disclosure includes multiple reaction cores assigned to different applications. Such architecture of the fault collection and reaction system allows isolation of faults at application level. Thus, the fault collection and reaction system of the present disclosure is capable of responding to the same fault from different applications with different appropriate reactions, thereby effectively increasing a count of available reactions on the SoC. Further, at any time instance, only the reaction core that is assigned to the application associated with the fault responds with the appropriate reaction, the remaining reaction cores are available for handling other faults. Thus, the fault collection and reaction system of the present disclosure has increased system availability as compared to existing fault collection and reaction systems.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
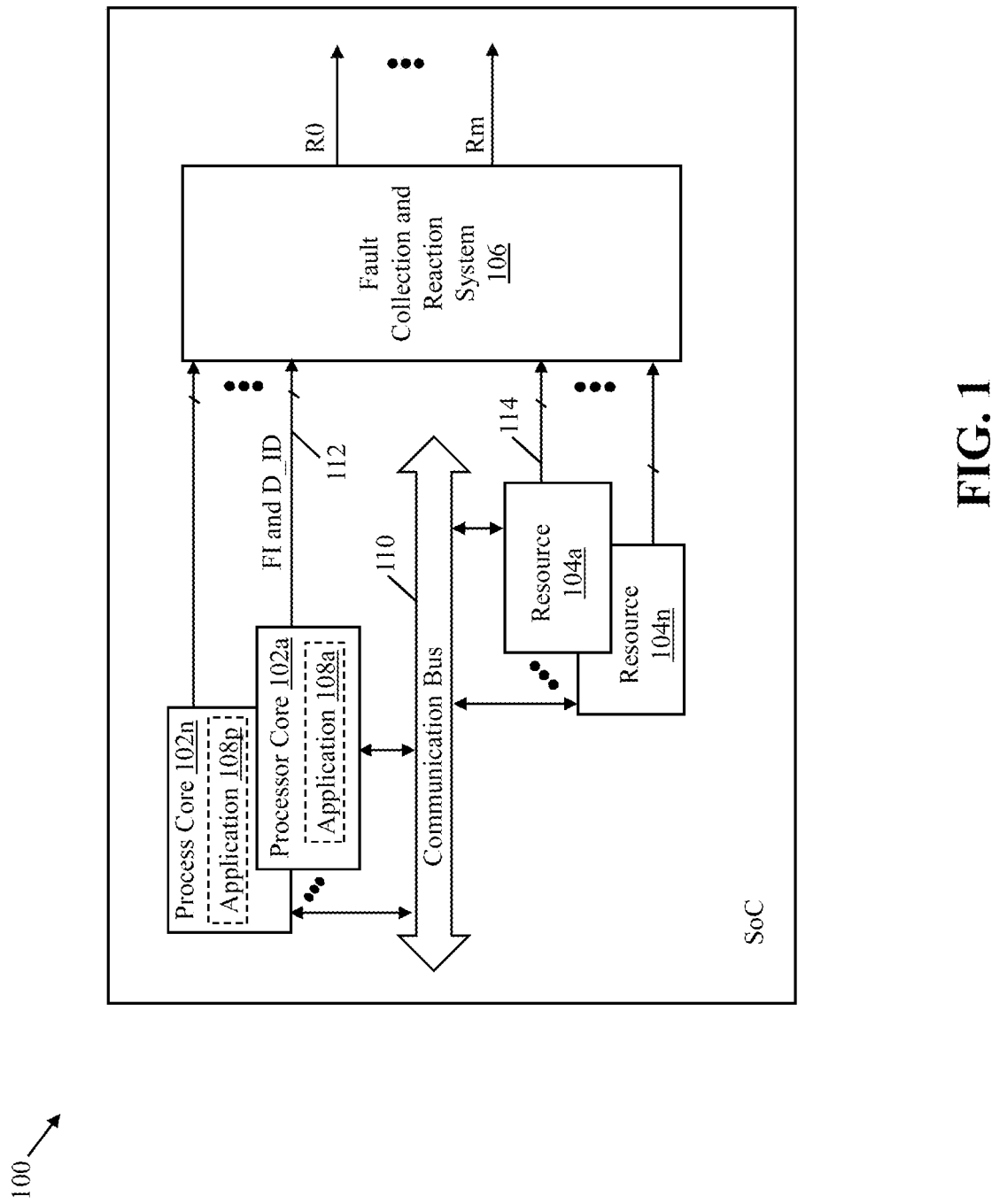
FIG. 1 illustrates a schematic block diagram of a system-on-chip (SoC) with fault collection and reaction capabilities, in accordance with an embodiment of the present disclosure.

FIG. 1 illustrates a schematic block diagram of a system-on-chip (SoC) 100 with fault collection and reaction capabilities, in accordance with an embodiment of the present disclosure. The SoC 100 includes first through $n^{th}$ processor cores 102a-102n, first through $n^{th}$ resources 104a-104n, and a fault collection and reaction system 106. The SoC 100 is embedded within an electronic system (not shown) such as an automotive system, an aircraft guidance system, a home security system, an industrial robotic system, or the like. It will be understood by those of ordinary skill in the art that the SoC 100 includes various other circuits and systems (e.g., a fault handling sub-system, a fault detection system, an interrupt handler, or the like) for its operation, which are not shown in order not to obscure the disclosure. Hereinafter, the first through $n^{th}$ processor cores 102a-102n are collectively referred to as "a plurality of processor cores 102a-102n" and the first through $n^{th}$ resources 104a-104n are collectively referred to as "a plurality of resources 104a-104n".

The plurality of processor cores 102a-102n are configured to execute (or nm) first through $p^{th}$ applications 108a-108p. Hereinafter, the first through $p^{th}$ applications 108a-108p are collectively referred to as "a plurality of applications 108a-108p". For example, when the SoC 100 is embedded within an automotive system, the plurality of applications 108a-108p may include an anti-lock braking application, an airbag control application, an adaptive cruise control application, or the like. In one embodiment, each processor core 102a-102n is configured to execute multiple applications, concurrently. In another embodiment, one application is executed on multiple processor cores 102a-102n. The plurality of processor cores 102a-102n may be implemented by way of central processing units, processors, microprocessors, electronic control units, microcontroller units, and the like. Each application 108a-108p is associated with a corresponding domain identifier. For example, the first application 108a being executed by the first processor core 102a is associated with a first domain identifier D_ID '0' and the second application 108b being executed by the second processor core 102b is associated with a second domain identifier D_ID '1'.

The plurality of resources 104a-104n are accessed by the plurality of processor cores 102a-102n for executing the plurality of applications 108a-108p. The execution of the plurality of applications 108a-108p includes a plurality of transactions between the plurality of resources 104a-104n and the plurality of processor cores 102a-102n. For example, for executing the first application 108a, the first processor core 102a may be required to transact with the first resource 104a. Each transaction initiates one or more subsequent operations at the corresponding resource 104a-104n. Examples of the plurality of resources 104a-104n include one or more hardware schedulers and controllers, a clocking circuit, one or more accelerators, a memory such as a static Random Access Memory (SRAM), a memory controller, one or more communication peripherals, or the like.

The plurality of resources 104a-104n are coupled to the plurality of processor cores 102a-102n by way a communication bus 110. In other words, the plurality of processor cores 102a-102n transact with the plurality of resources 104a-104n by way of the communication bus 110. The communication bus 110 is a communication interface such as, but not limited to, an advanced microcontroller bus architecture (AMBA), an advanced high-performance bus (AHB), an advanced peripheral bus (APB), an and advanced extensible interface (AXI) bus.

The fault collection and reaction system 106 is coupled to the plurality of processor cores 102a-102n and the plurality of resources 104a-104n by way of respective fault buses 112 and 114. The fault collection and reaction system 106 is configured to receive fault indications FIs from the plurality of processor cores 102a-102n and the plurality of resources 104a-104n by way of the fault buses 112 and 114. The fault collection and reaction system 106 receives a fault indication FI in response to occurrence of a fault (e.g., a software fault or a hardware fault) at any of the plurality of processor cores 102a-102n and the plurality of resources 104a-104n. The fault indication FI is an information message that includes information pertaining to the fault such as, but not limited to, a type of fault, a time at which that the fault had occurred, and various other parameters required to characterize or reproduce one or more fault conditions. In one embodiment, the fault may occur based on a failure of one of the plurality of transactions between the plurality of processor cores 102a-102n and the plurality of resources 104a-104n. For example, a fault may occur based on a failure of a first transaction performed between the first processor core 102a and the first resource 104a for executing the first application 108a. In another embodiment, a fault may occur based on a failure of an operation of one of the plurality of resources 104a-104n subsequent to a transaction. For example, a fault may occur based on a failure of an operation of the first resource 104a subsequent to the first transaction. Along with the fault indication FI, the fault collection and reaction system 106 is configured to receive a domain identifier D_ID that indicates an application (e.g., one of the plurality of applications 108a-108p) associated with the fault. For example, the fault collection and reaction system 106, along with the fault indication FI, receives the first domain identifier D_ID '0' when the fault is associated with the first application 108a. The fault collection and reaction system 106 is configured to respond to the fault indication FI with an appropriate reaction R0-Rm that enables recovery from the fault.

In other words, the fault collection and reaction system 106 provides fault collection and reaction capability to the SoC 100 for controlling and collecting various faults reported by the plurality of processor cores 102a-102n and the plurality of resources 104a-104n. The fault collection and reaction system 106 responds with different reactions for different faults. Further, the fault collection and reaction system 106 responds with different reactions to the same faults in different applications 108a-108p. Various components of the fault collection and reaction system 106 are described in FIG. 2.

Figure 2:
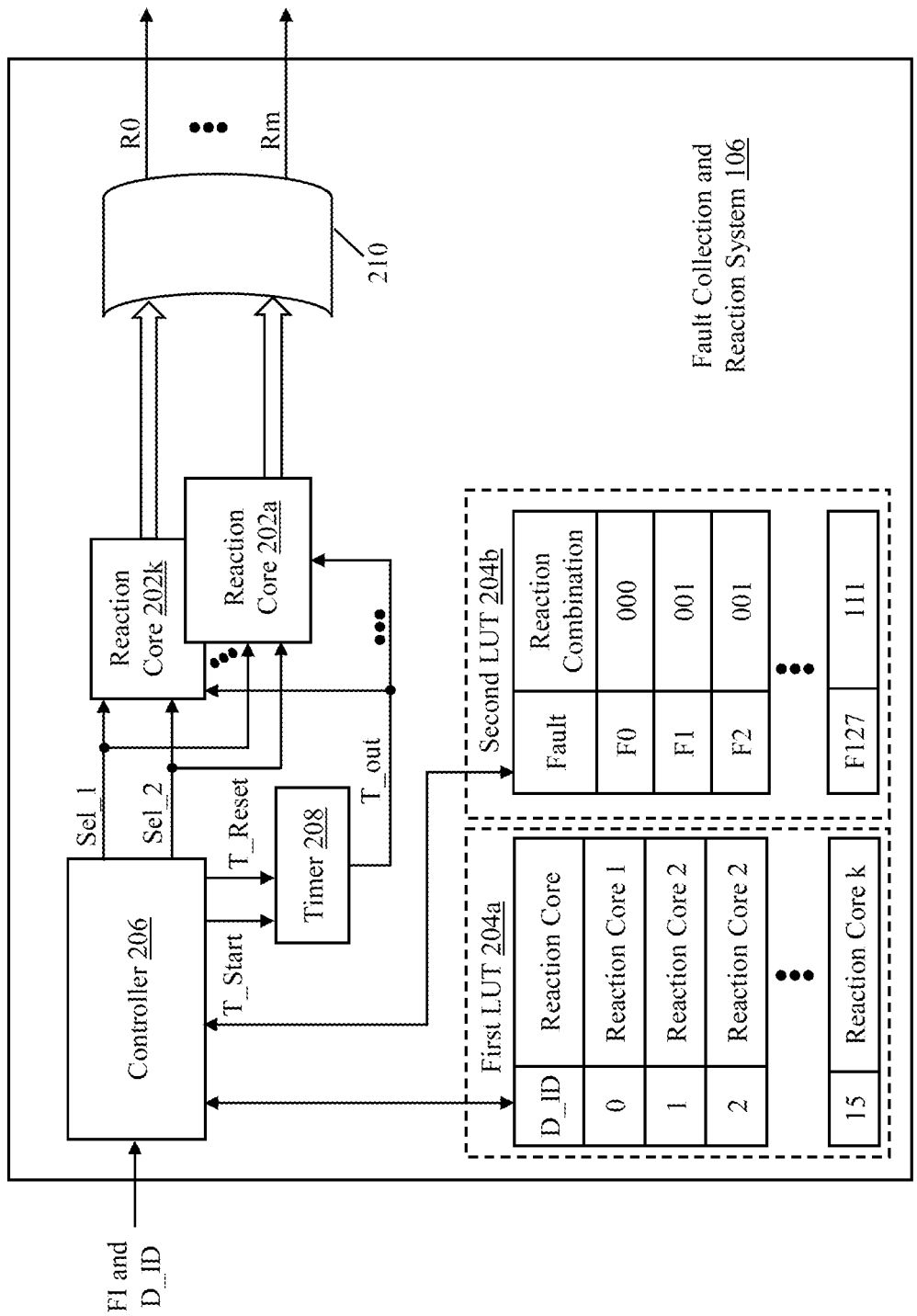
FIG. 2 illustrates a schematic block diagram of a fault collection and reaction system on the SoC of FIG. 1, in accordance with an embodiment of the present disclosure.

FIG. 2 illustrates a schematic block diagram of the fault collection and reaction system 106, in accordance with an exemplary embodiment of the present disclosure. The fault collection and reaction system 106 includes first through $k^{th}$ reaction cores 202a-202k, first and second look-up tables (LUTs) 204a and 204b, a controller 206, a timer 208, and a first logic gate 210. Hereinafter, the first through $k^{th}$ reaction cores 202a-202k are collectively referred to as "a plurality of reaction cores 202a-202k".

The plurality of reaction cores 202a-202k are coupled to the controller 206, the timer 208, and the first logic gate 210. Each reaction core 202a-202k is assigned to at least one of the plurality of applications 108a-108p. In one example, the first reaction core 202a is assigned to the first application 108a and the second reaction core 202b is assigned to the second and third applications 108b and 108c. Based on a fault indication FI and a domain identifier D_ID received by the fault collection and reaction system 106 one of the plurality of reaction cores 202a-202k is selected to respond to the fault indication FI with an appropriate reaction R0-Rm. In other words, the reaction R0-Rm for handling the fault is outputted by one of the plurality of reaction cores 202a-202k that is selected. Inclusion of multiple reaction cores 202a-202k in the fault collection and reaction system 106 enables the fault collection and reaction system 106 to respond with different reactions to the same fault associated with different applications 108a-108p.

The first LUT 204a is coupled to the controller 206 and configured to store therein a first mapping between the plurality of reaction cores 202a-202k and corresponding plurality of domain identifiers. For example, as illustrated by a first row of the first LUT 204a, the first domain identifier D_ID '0' is mapped to the first reaction core 202a. Similarly, mapping between other domain identifiers D_IDs '1'-'15' and remaining reaction cores 208b-208k is illustrated by remaining rows of the first LUT 204a. When a reaction core (e.g., one of the plurality of reaction cores 202a-202k) is mapped to a domain identifier D_ID, the reaction core is designated to respond to those fault indications FIs that pertain to the mapped domain identifier D_ID. Thus, as per the first mapping in the first LUT 204a, the first reaction core 202a is designated to respond to fault indications FIs that pertain to the first domain identifier D_ID '0'. For the sake of brevity, the first LUT 204a is shown to include the first mapping between 16 domain identifiers D_IDs and 'k' reaction cores. However, in actual implementation a count of reaction cores and domain identifiers D_IDs may vary as per system requirement of the electronic system in which the SoC 100 is embedded.

The second LUT 204b is coupled to the controller 206 and configured to store therein a second mapping between a plurality of faults (e.g., faults F0-F127) and a set of reaction combinations. The plurality of faults include those faults that are likely to occur on the SoC 100. For example, as illustrated in a first row of the second LUT 204a, a first fault 'F0' is mapped to a first reaction combination '000'. Similarly, other faults F1-F127 are mapped to remaining reaction combinations. For the sake of brevity, the second LUT 204b is shown to include the second mapping between eight reaction combinations and 128 faults. However, in actual implementation a count of reaction combinations and faults may vary as per system configuration of the electronic system.

The controller 206 is coupled to the plurality of reaction cores 202a-202k, the first and second LUTs 204a and 204b, and the timer 208. The controller 206 is configured to receive the fault indication FI on one of the fault buses 112 and 114 when one of the plurality of faults occurs on the SoC 100. The controller 206 is further configured to receive one of the plurality of domain identifiers D_IDs along with the fault indication FI. The received domain identifier D_ID is indicative of one of the plurality of applications 108a-108p that is associated with the reported fault (e.g., the first fault F0). The controller 206 is further configured to select: one of the plurality of reaction cores 202a-202k that is mapped to the received domain identifier D_ID in the first LUT 204a and one of the plurality of reaction combinations that is mapped to the indicated fault in the second LUT 204b. The controller 206 is further configured to generate and provide first and second selection signals Sel_1 and Sel_2 to the plurality of reaction cores 202a-202k. The first selection signal Sel_1 is generated to indicate the selection of one of the plurality of reaction cores 202a-202k, and the second selection signal Sel_2 is generated to indicate the selection of one of the plurality of reaction combinations. The controller 206 is further configured to generate and provide a start signal T_Start to the timer 208 upon receiving the fault indication FI. The start signal T_Start indicates a timer value associated with the fault reported by the fault indication FI. The controller 206 is further configured to generate and provide a reset signal T_Reset to the timer 208 when the fault is handled.

The timer 208 is a programmable timer that is configured to receive the start signal T_Start from the controller 206 and run based on the timer value indicated by the start signal T_Start. The timer 208 is further configured to generate and provide a time-out signal T_Out to the plurality of reaction cores 202a-202k. The time-out signal T_Out is by default at a first logic state (e.g., logic low) and transitions from the first logic state to a second logic state (e.g., logic high) when the timer value expires (i.e., when the timer 208 times-out). The timer 208 is configured to receive the reset signal T_Reset from the controller 206 and reset to a default state. In other words, the timer 208 resets when the fault is handled.

The first logic gate 210 has a plurality of input terminals that are coupled to the plurality of reaction cores 202a-202k and a plurality of output terminals that are coupled to various reaction buses (not shown) on the SoC 100. The first logic gate 210 is configured to receive the reaction R0-Rm outputted by one of the plurality of reaction cores 202a-202k and provide the received reaction R0-Rm, by way of the reaction buses, to various components and modules on the SoC 100, for example, the plurality of processor cores 102a-102n, the plurality of resources 104a-104n, an interrupt controller (not shown), a reset generator (not shown), a power management and control system (not shown), a fault handler (not shown), or the like. In one example, the first logic gate 210 is an OR gate. Thus, outputs of the plurality of reaction cores 202a-202k are ORed by the first logic gate 210. Thus, the first logic gate 210 enables the mapping of reactions outputted by the plurality of reaction cores 202a-202k onto the same reaction buses. In one example, the reaction buses are asserted or de-asserted based on the outputted reaction R0-Rm.

Figure 3:
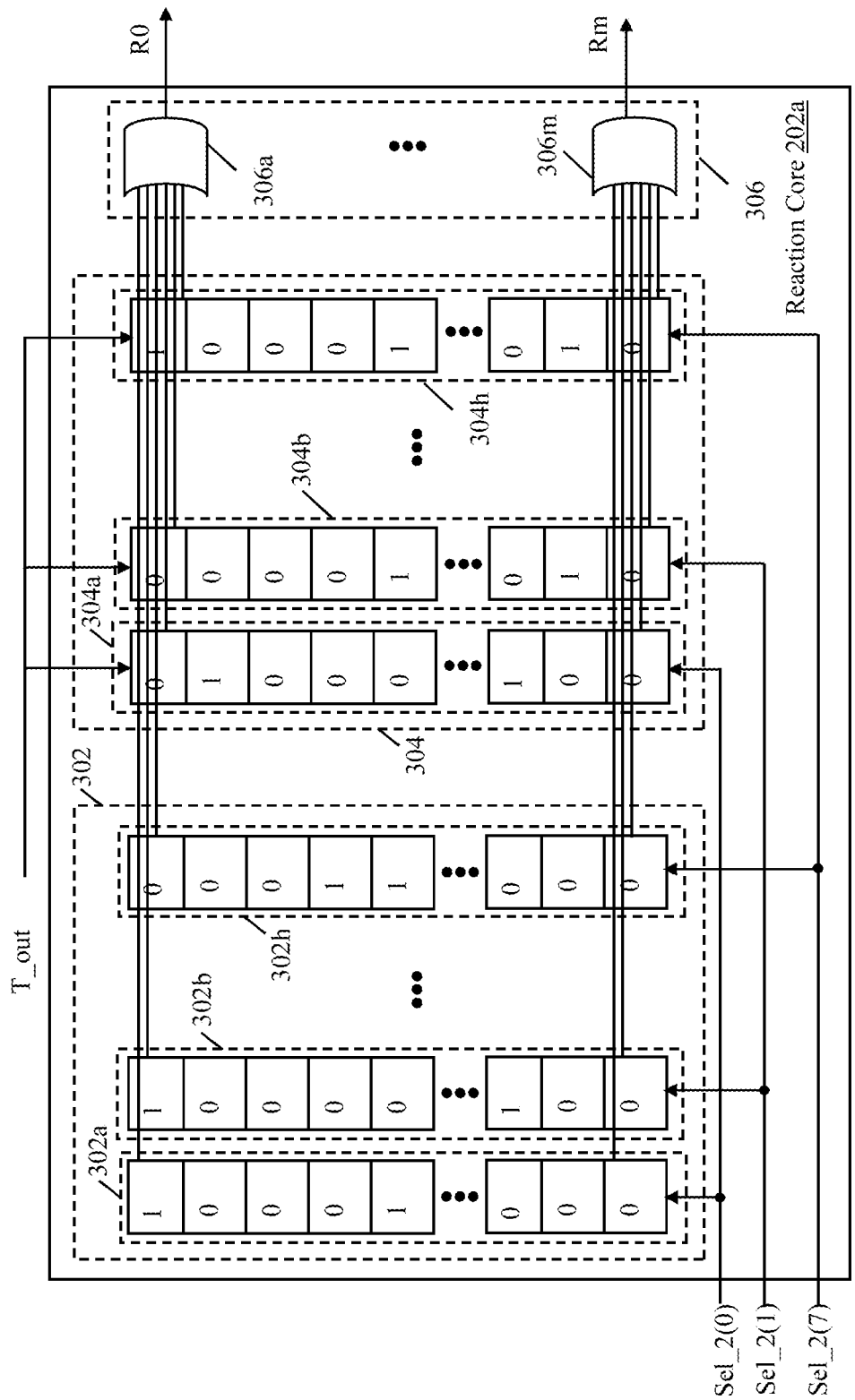
FIG. 3 is a schematic block diagram of a reaction core of the fault collection and reaction system of FIG. 2, in accordance with another embodiment of the present disclosure.

FIG. 3 illustrates a schematic block diagram of the first reaction core 202a, in accordance with an embodiment of the present disclosure. The first reaction core 202a includes first through eighth immediate reaction LUTs 302a-302h, first through eighth delayed reaction LUTs 304a-304h, and a first logic circuit 306. Hereinafter, the first through eighth immediate reaction LUTs 302a-302h are collectively referred to and designated as "a set of immediate reaction LUTs 302" and the first through eighth delayed reaction LUTs 304a-304h are collectively referred to and designated as "a set of delayed reaction LUTs 304".

The set of immediate reaction LUTs 302 is coupled to the controller 206 and configured to receive the second selection signal Sel_2. Based on the second selection signal Sel_2, one of the set of immediate reaction LUTs 302 is selected to respond to the fault indication FI. For example, when the second selection signal Sel_2 is '00000001' (i.e., when Sel_2(0)=1), the first immediate reaction LUT 302a is selected to respond to the fault indication FI. Similarly, when the second selection signal Sel_2 is '00000010' (i.e., when Sel_2(1)=1), the second immediate reaction LUT 302b is selected to respond to the fault indication FI.

Each immediate reaction LUT 302a-302h is associated with one of the set of reaction combinations stored in the second LUT 204b. For example, the first immediate reaction LUT 302a is associated with the first reaction combination '000' and the second immediate reaction LUT 302b is associated with the second reaction combination '001'. Thus, the controller 206 generates the second selection signal Sel_2 in such a manner that one of the set of immediate reaction LUTs 302 that is associated with the selected reaction combination is selected for responding to the fault indication FI. For example, when the selected reaction combination is '000', the controller 206 generates the second selection signal Sel_2 as '00000001' to select the first immediate reaction LUT 302a. Similarly, when the selected reaction combination is '111', the controller 206 generates the second selection signal Sel_2 as '10000000' to select the eighth immediate reaction LUT 302h. Further, each immediate reaction LUT 302a-302h is configured to store therein an immediate reaction configuration corresponding to at least one of the plurality of faults. The selected immediate reaction LUT (e.g., the first immediate reaction LUT 302a) is configured to output the reaction R0-Rm based on the immediate reaction configuration stored therein. In other words, each immediate reaction LUT 302a-302h stores therein a different immediate reaction configuration that results in an appropriate reaction to handle at least one of the plurality of faults. Configuring different immediate reaction LUTs 302a-302h with different immediate reaction configurations enables the fault collection and reaction system 106 to respond to different faults in the same application (e.g., the first application 108a) with different reactions.

The set of delayed reaction LUTs 304 is coupled to the controller 206 and the timer 208, and configured to receive the second selection signal Sel_2 and the time-out signal T_Out. Based on the second selection signal Sel_2, one of the set of delayed reaction LUTs 304 is selected to respond to the fault indication FI. However, the selected delayed reaction LUT (e.g., the first delayed reaction LUT 304a) is disabled when the time-out signal T_Out is at the first logic state and enabled when the time-out signal T_Out is at the second logic state. For example, when the second selection signal Sel_2 is '00000001' (i.e., when Sel_2(0)=1), the first delayed reaction LUT 304a is selected to respond to the fault indication FI. However, the first delayed reaction LUT 304a remains disabled until the time-out signal T_Out transitions from the first logic state to the second logic state.

Each delayed reaction LUT 304a-304h is associated with one of the set of reaction combinations stored in the second LUT 204b. For example, the first delayed reaction LUT 304a is associated with the first reaction combination '000' and the second delayed reaction LUT 304b is associated with the second reaction combination '001'. Thus, the controller 206 generates the second selection signal Sel_2 in such a manner that one of the set of delayed reaction LUTs 304 that is associated with the selected reaction combination is selected for responding to the fault indication FI. For example, when the selected reaction combination is '000', the controller 206 generates the second selection signal Sel_2 as '00000001' to select the first delayed reaction LUT 304a. Similarly, when the selected reaction combination is '111', the controller 206 generates the second selection signal Sel_2 as '10000000' to select the eighth delayed reaction LUT 304h. Thus, based on the second selection signal Sel_2 and the time-out signal T_Out, the set of delayed reaction LUTs 304 are controlled for responding to the fault indication FI. Each delayed reaction LUT 304a-304h is configured to store therein a delayed reaction configuration corresponding to at least one of the plurality of faults. The selected delayed reaction LUT (e.g., the first delayed reaction LUT 304a) when enabled outputs the reaction R0-Rm based on the delayed reaction configuration stored therein. In other words, each delayed reaction LUT 304a-304h stores therein a delayed reaction configuration that results in an appropriate reaction to handle at least one of the plurality of faults. Configuring different delayed reaction LUTs 304a-304h with different delayed reaction configurations enables the fault collection and reaction system 106 to respond to different faults in the same application (e.g., the first application 108a) with different reactions.

In other words, for responding to the fault indication FI, one of the immediate reaction LUTs 302a-302h and one of the delayed reaction LUTs 304a-304h are selected based on the second mapping in the second LUT 204b and the second selection signal Sel_2. When the time-out signal T_Out is at the first logic state, only the selected immediate reaction LUT outputs the reaction R0-Rm and when the time-out signal T_Out is at the second logic state, the selected immediate reaction LUT and the selected delayed reaction LUT output the reaction R0-Rm.

In FIG. 3, each immediate reaction LUT 302a-302h and each delayed reaction LUT 304a-304h is shown to include multiple memory cells each storing '0' or '1' value. A combination of the '0' and '1' values stored in the memory cells of each immediate reaction LUT 302a-302h constitutes the immediate reaction configuration of the corresponding immediate reaction LUT 302a-302h. Similarly, a combination of the '0' and '1' values stored in the memory cells of each delayed reaction LUT 304a-304h constitutes the delayed reaction configuration of the corresponding delayed reaction LUT 304a-304h. In one embodiment, each memory cell may represent a flip-flop that is configured to store '0' or '1' value. In another embodiment, each memory cell may represent a memory cell of an in-bit register.

The set of immediate reaction LUTs 302 and the set of delayed reaction LUTs 304 are coupled to input terminals of the first logic circuit 306. The first logic circuit 306 includes second through m+1$^{th}$ logic gates 306a-306m that are configured to receive reactions outputted by the set of immediate reaction LUTs 302 and the set of delayed reaction LUTs 304. In one example, the plurality of logic gates 306a-306m are OR gates. In such a scenario, first memory cells of the set immediate reaction LUTs 302 and the set of delayed reaction LUTs 304 are coupled to the second logic gate 306a. Similarly, second memory cells of the set immediate reaction LUTs 302 and the set of delayed reaction LUTs 304 are coupled the third logic gate 306b. The first logic circuit 306 is further coupled to the first logic gate 210 and configured to provide reactions (e.g., the reaction R0-Rm) outputted by the set of immediate reaction LUTs 302 and the set of delayed reaction LUTs 304 to the first logic gate 210.

It will be understood by those of skill in the art that other reaction cores 202b-202k are similar to the first reaction core 202a and include corresponding sets of immediate and delayed reaction LUTs. Based on desired reactions from the other reaction cores 202b-202k, immediate and delayed reaction configurations stored in the respective immediate and delayed reaction LUTs may vary from the immediate and delayed reaction configurations stored in the set of immediate reaction LUTs 302 and the set of delayed reaction LUTs 304, respectively. Further, the scope of the disclosure is not limited to having only eight immediate reaction LUTs and eight delayed reaction LUTs in the plurality of reaction cores 202a-202k. In other embodiments, the plurality of reaction cores 202a-202k may have any number of immediate and delayed reaction LUTs depending upon desired system configuration of the electronic system.

In operation, when one of the plurality of faults occurs on the SoC 100, the controller 206 receives a fault indication FI that reports the fault and one of the plurality of domain identifiers D_ID that is associated with the fault. In a non-limiting example, it is assumed that the fault indication FI is received in response to occurrence of the first fault F0 associated with the first application 108a. In such a scenario, the received domain identifier D_ID is '0' associated the first application 108a.

The controller 206 looks-up the first LUT 204a and selects the first reaction core 202a that is mapped to the received domain identifier D_ID '0' in the first LUT 204a. Further, the controller 206 looks-up the second LUT 204b and selects the first reaction combination '000' that is mapped to the first fault F0 in the second LUT 204b. The controller 206 generates the first and second selection signals Sel_1 and Sel_2 to indicate the selection of the first reaction core 202a and the first reaction combination '000', respectively. The controller 206 provides the first and second selection signals Sel_1 and Sel_2 to the plurality of reaction cores 202a-202k. Based on the received fault indication FI, the controller 202 further generates and provides the start signal T_Start to the timer 208. The timer 208 receives the start signal T_Start and runs based on the timer value indicated by the start signal T_Start. The timer 208 further generates and provides the time-out signal T_Out that is at the first logic state (i.e., logic low) to the plurality of reaction cores 202a-202k (i.e., the set of delayed reaction LUTs 304 and sets of delayed reaction LUTs of the remaining reaction cores 202b-202k).

Based on the first selection signal Sel_1, the selected first reaction core 202a is enabled to respond to the fault indication FI with the reaction R0-Rm. The second selection signal Sel_2 is received by the set of immediate reaction LUTs 302 and the set of delayed reaction LUTs 304. The set of delayed reaction LUTs 304 further receives the time-out signal T_Out from the timer 208. Based on the second selection signal Sel_2, the first immediate reaction LUT 302a and the first delayed reaction LUT 304a, associated with the first reaction combination, are selected to respond to the fault indication FI. Since the time-out signal T_Out received by the first delayed reaction LUT 304a is at the first logic state, the first delayed reaction LUT 304a remains disabled. Thus, the selected first immediate reaction LUT 302a outputs the reaction R0-Rm as per the immediate reaction configuration stored therein. The reaction R0-Rm outputted by the first immediate reaction LUT 302a is provided to the first logic circuit 306 and the first logic gate 210 for outputting. Based on the combination of '0' and '1' values stored in the selected first immediate reaction LUT 302a, corresponding reaction buses are asserted and de-asserted to output the reaction R0-Rm.

Based on the reaction R0-Rm outputted by the first immediate reaction LUT 302a, the first fault F0 is handled and the first application 108a is transitioned to a safe state from a faulty state. The controller 206 generates and provides the reset signal T_Reset to the timer 208. Upon receiving the reset signal T_Reset, the timer 208 resets to the default state.

In another embodiment, the reaction R0-Rm outputted by the first immediate reaction LUT 302a may fail to handle the first fault F0 before the expiry of the timer 208. Thus, when the timer 208 expires, the time-out signal T_Out transitions from the first logic state to the second logic state (i.e., logic high) and the selected first delayed reaction LUT 304a is enabled. When the first delayed reaction LUT 304a is enabled, a combination of the first immediate reaction LUT 302a and the first delayed reaction LUT 304a outputs the reaction R0-Rm as per an ORed combination of the respective immediate reaction configuration and the respective delayed reaction configuration stored therein. Based on the reaction R0-Rm outputted by the combination of the first immediate reaction LUT 302a and the first delayed reaction LUT 304a, the first fault F0 is handled and the first application 108a is transitioned to a safe state from the faulty state.

Figure 4:
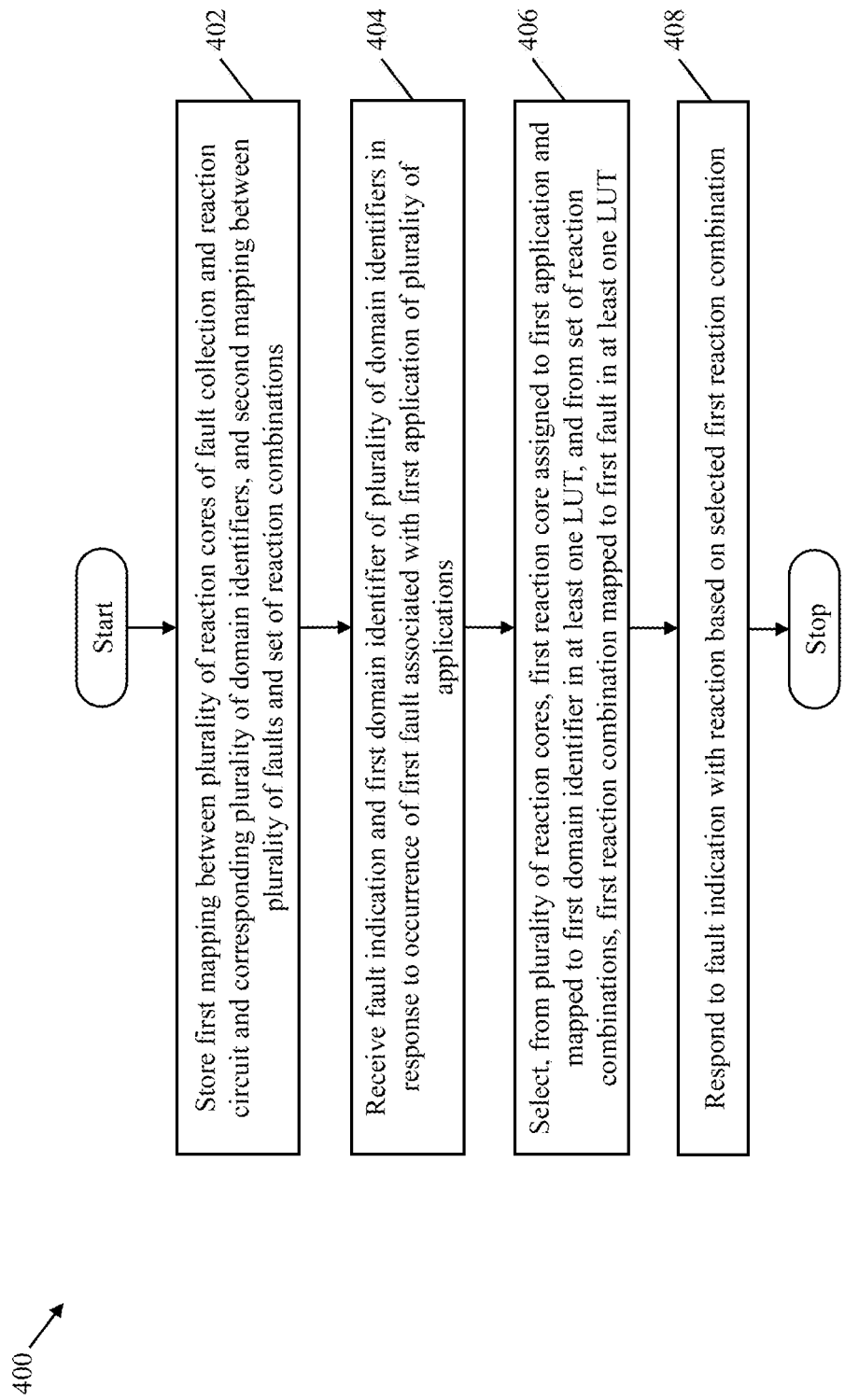
FIG. 4 is a flow chart that illustrates a fault collection and reaction method implemented in the SoC of FIG. 1, in accordance with an embodiment of the present disclosure.

FIG. 4 is a flow chart 400 that illustrates a fault collection and reaction method implemented in the SoC of FIG. 1, in accordance with an embodiment of the present disclosure.

At step 402, the first mapping between the plurality of reaction cores 202a-202k and the corresponding plurality of domain identifiers D_IDs, and the second mapping between the plurality of faults associated with the plurality of applications 108a-108p and the set of reaction combinations are stored in the fault collection and reaction system 106. For example, the first and second LUTs 204a and 204b are configured to store therein the first mapping between the plurality of reaction cores 202a-202k and the corresponding plurality of domain identifiers D_IDs, and the second mapping between the plurality of faults associated with the plurality of applications 108a-108p and the set of reaction combinations, respectively. At step 404, the fault indication FI and the first domain identifier D_ID '0' of the plurality of domain identifiers D_IDs are received by the fault collection and reaction system 106 in response to occurrence of the first fault F0 associated with the first application 108a. For example, the controller 206 is configured to receive the fault indication FI and the first domain identifier D_ID '0'. At step 406, from the plurality of reaction cores 202a-202k, the first reaction core 202a assigned to the first application 108a and mapped to the first domain identifier D_ID '0' in the first LUT 204a is selected, and from the set of reaction combinations, the first reaction combination mapped to the first fault F0 in the second LUT 204b is selected, by the fault collection and reaction system 106. For example, the controller 206 is further configured to select from the plurality of reaction cores 202a-202k, the first reaction core 202a mapped to the first domain identifier D_ID '0' in the first LUT 204a, and from the set of reaction combinations, the first reaction combination mapped to the first fault F0 in the second LUT 204b. At step 408, the fault collection and reaction system 106 responds to the fault indication FI with the reaction R0-Rm based on the selected reaction combination. For example, the selected first reaction core 202a is configured to respond to the fault indication FI with the reaction R0-Rm based on the selected reaction combination.

Figure 5:
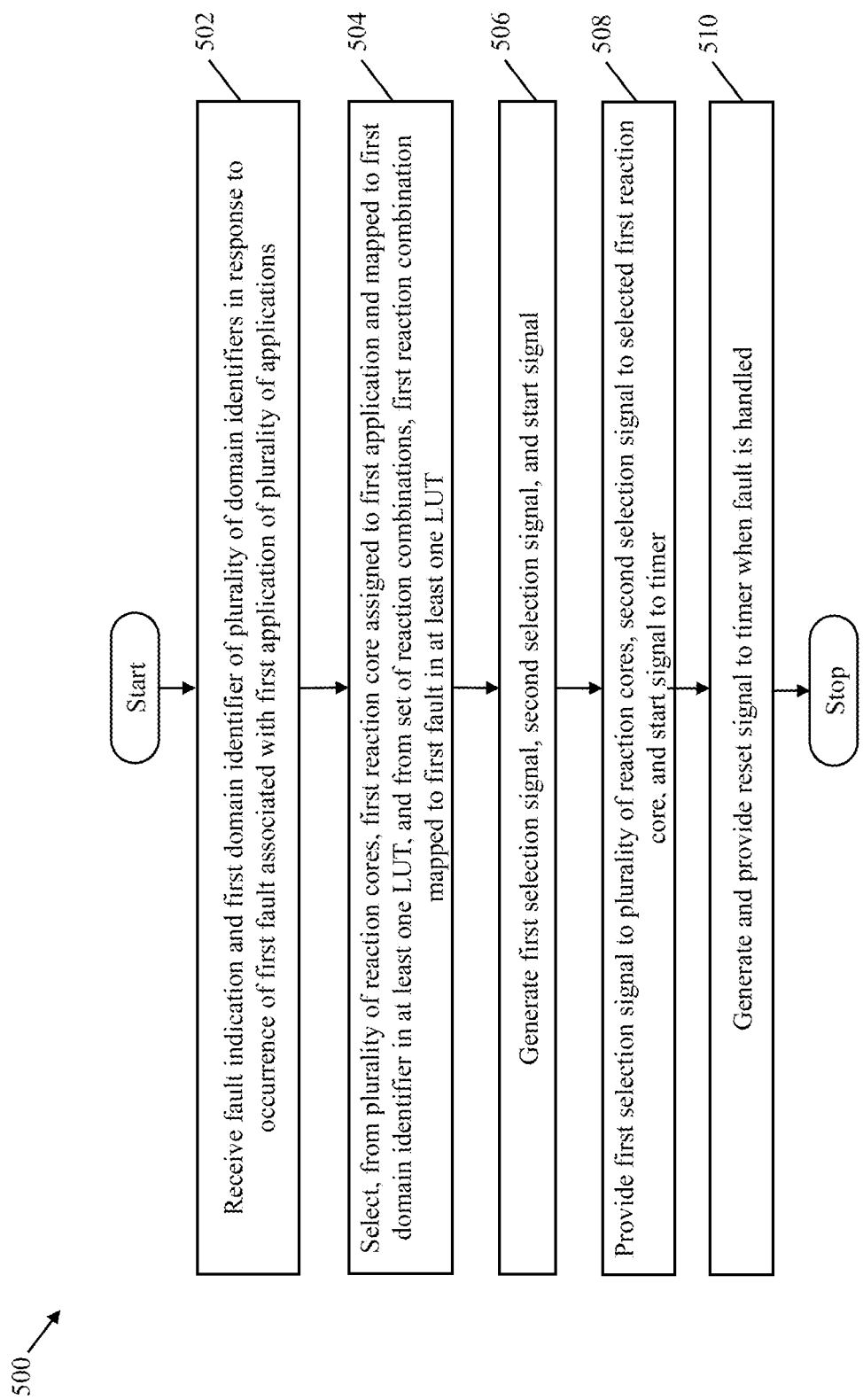
FIG. 5 is a flow chart that illustrates various operations performed by a controller of the fault collection and reaction system of FIG. 2 to implement the fault collection and reaction method of FIG. 4, in accordance with an embodiment of the present disclosure.

FIG. 5 is a flow chart 500 that illustrates various operations performed by the controller 206 to implement the fault collection and reaction method of FIG. 4, in accordance with an embodiment of the present disclosure.

At step 502, the controller 206 is configured to receive the fault indication FI and the first domain identifier D_ID '0' of the plurality of domain identifiers D_IDs in response to occurrence of the first fault F0 associated with the first application 108a of the plurality of applications 108a-108p. At step 504, the controller 206 is configured to select from the plurality of reaction cores 202a-202k, the first reaction core 202a assigned to the first application 108a and mapped to the first domain identifier D_ID '0' in the first LUT 204a, and from the set of reaction combinations, the first reaction combination mapped to the first fault F0 in the second LUT 204b. At step 506, the controller 206 is configured to generate the first selection signal Sel_1, the second selection signal Sel_2, and the start signal T_Start. The first selection signal Sel_1 is generated to indicate the selection of the first reaction core 202a from the plurality of reaction cores 202a-202k and the second selection signal Sel_2 is generated to indicate the selection of the first reaction combination from the set of reaction combinations. The start signal T_Start indicates the timer value associated with the first fault F0. At step 508, the controller 206 is configured to provide the first selection signal Sel_1 to the plurality of reaction cores 202a-202k, the second selection signal Sel_2 to the selected first reaction core 202a, and the start signal T_Start to the timer 208. At step 510, the controller 206 is configured to generate and provide the reset signal T_Reset to the timer 208 when the first fault F0 is handled and the process ends.

Figure 6:
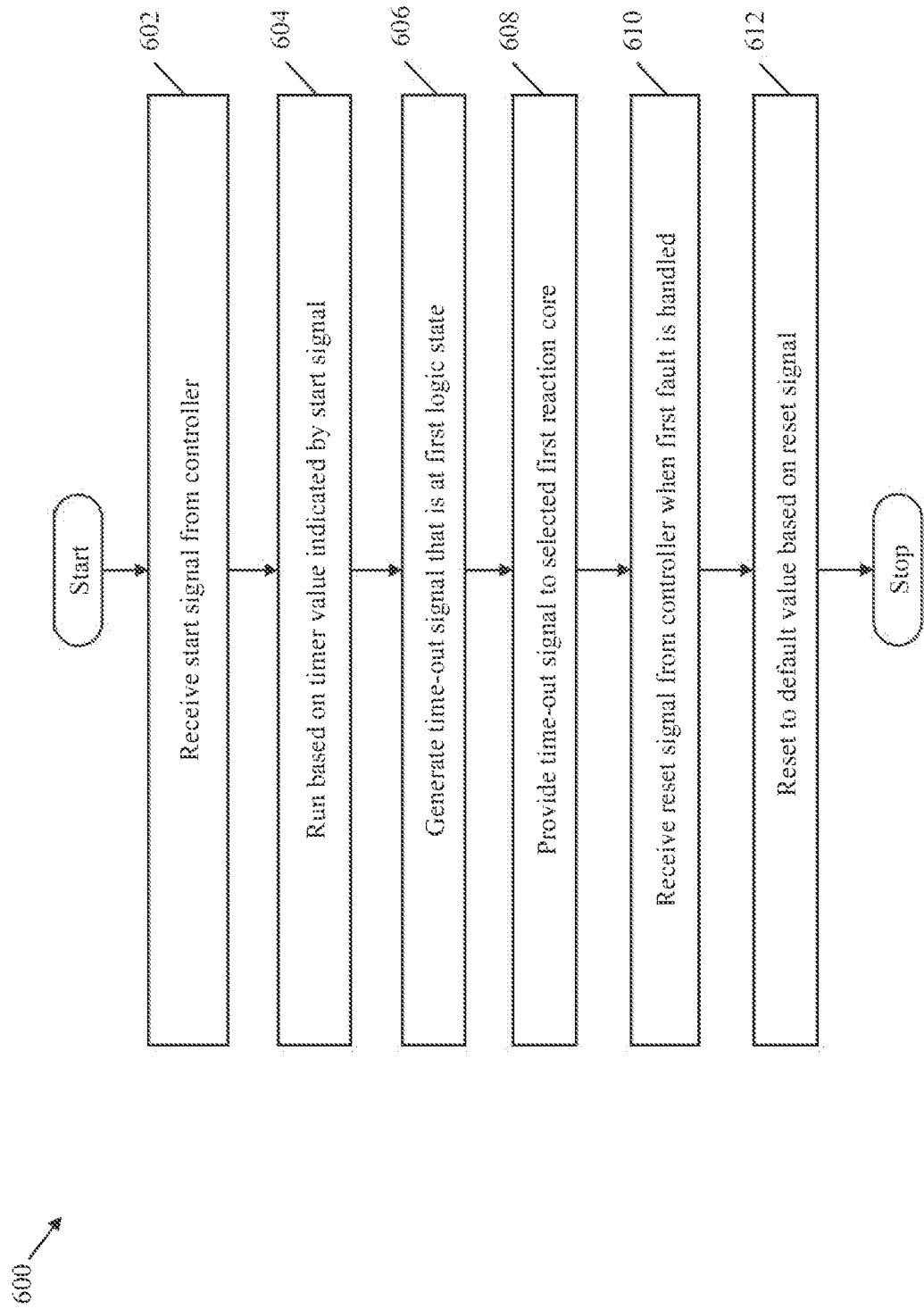
FIG. 6 is a flow chart that illustrates various operations performed by a timer of the fault collection and reaction system of FIG. 2 to implement the fault collection and reaction method of FIG. 4, in accordance with an embodiment of the present disclosure.

FIG. 6 is a flow chart 600 that illustrates various operations performed by the timer 208 to implement the fault collection and reaction method FIG. 4, in accordance with an embodiment of the present disclosure.

At step 602, the timer 208 is configured to receive the start signal T_Start from the controller 206. At step 604, the timer 208 is configured to run based on the timer value indicated by the start signal T_Start. At step 606, the timer 208 is configured to generate the time-out signal T_Out that is at the first logic state. At step 608, the timer 208 is configured to provide the time-out signal T_Out to the selected first reaction core 202a. The time-out signal T_Out transitions from the first logic state to the second logic state when the timer 208 times out or expires. At step 610, the timer 208 is configured to receive the reset signal T_Reset from the controller 206 when the first fault F0 is handled. At step 612, the timer 208 is configured to reset to the default value based on the reset signal T_Reset.

Figure 7:
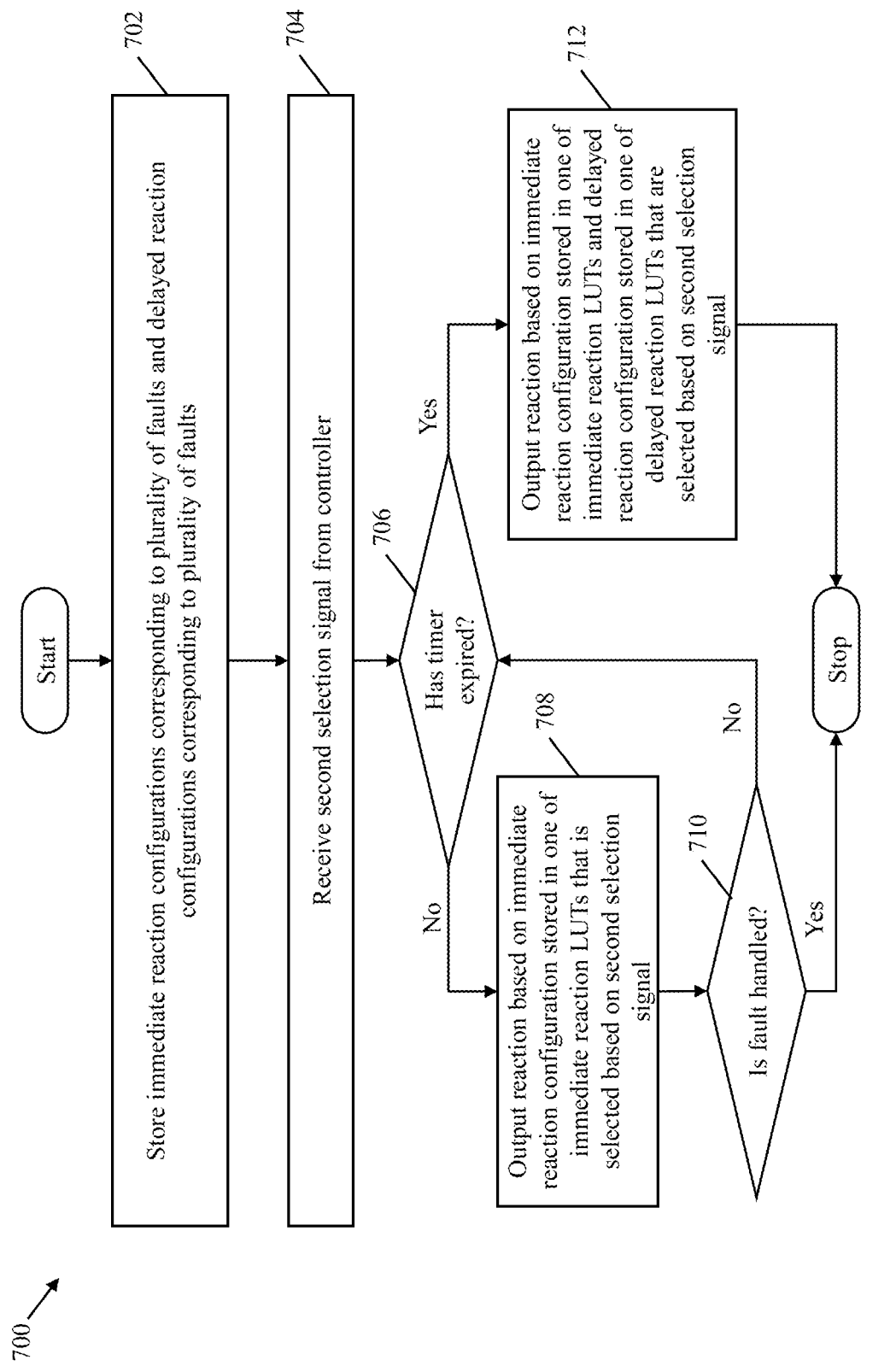
FIG. 7 is a flow chart that illustrates various operations performed by sets of immediate and delayed reaction look-up tables (LUTs) of the fault collection and reaction system of FIG. 2 to implement the fault collection and reaction method of FIG. 4, in accordance with an embodiment of the present disclosure.

FIG. 7 is a flow chart 700 that illustrates various operations performed by the set of immediate reaction LUTs 302 and the set of delayed reaction LUTs 304 to implement the fault collection and reaction method FIG. 4, in accordance with an embodiment of the present disclosure.

At step 702, the set of immediate reaction LUTs 302 is configured to store immediate reaction configurations corresponding to the plurality of faults and the set of delayed reaction LUTs 304 is configured to store the delayed reaction configuration corresponding to the plurality of faults. At step 704, the set of immediate reaction LUTs 302 and the set of delayed reaction LUTs 304 are configured to receive the second selection signal Sel_2 from the controller 206. At step 706, based on the time-out signal T_Out, it is determined whether the timer 208 has expired. If at step 706, it is determined that the timer 208 has not expired, step 708 is executed. At step 708, one of the set of immediate reaction LUTs 302 that is selected based on the second selection signal Sel_2 is configured to output the reaction R0-Rm based on the immediate reaction configuration stored therein. At step 710, it is determined whether the first fault F0 is handled. If at step 710, it is determined that the first fault F0 is not handled, step 706 is executed.

If at step 706, it is determined that the timer 208 has expired, step 712 is executed. At step 712, one of the set of immediate reaction LUTs 302 and one of the set of delayed reaction LUTs 304 that are selected based on the second selection signal Sel_2 are configured to output the reaction R0-Rm based on the corresponding immediate and delayed reaction configurations stored therein. The process ends when the first fault F0 is handled.

Instead of relying on a single central core for responding to fault indications FIs, the fault collection and reaction system 106 of the present disclosure includes multiple reaction cores 202a-202k assigned to different applications 108a-108p. Such architecture of the fault collection and reaction system 106 allows isolation of faults at application level, i.e., no interference between faults associated with different applications 108a-108p. Thus, the fault collection and reaction system 106 of the present disclosure is capable of responding to the same fault from different applications 108a-108p with different appropriate reactions, thereby effectively increasing the count of available reactions on the SoC 100. In other words, technological improvements in the fault collection and reaction system 106 allow multiple safe states to be achieved for the same fault occurring in different applications 108a-108p. Further, at any time instance, only the reaction core (e.g., the first reaction core 202a) that is assigned to the application (e.g., the first application 108a) associated with the fault responds with the appropriate reaction, the remaining reaction cores (e.g., the second through $k^{th}$ reaction cores 202b-202k) are available for handling other faults. Thus, the fault collection and reaction system 106 of the present disclosure has increased system availability as compared to existing fault collection and reaction systems.

Unless stated otherwise, terms such as "first" and "second" are used to arbitrarily distinguish between the elements such terms describe. Thus, these terms are not necessarily intended to indicate temporal or other prioritization of such elements.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A system-on-chip (SoC), comprising:
 a plurality of processor cores configured to execute a plurality of applications;
 a fault collection and reaction system coupled to the plurality of processor cores, the fault collection and reaction system comprising:
  a plurality of reaction cores each assigned to at least one of the plurality of applications;
  at least one look-up-table (LUT) configured to store a first mapping between the plurality of reaction cores and corresponding plurality of domain identifiers, and a second mapping between a plurality of faults associated with the plurality of applications and a set of reaction combinations; and
  a controller coupled to the plurality of reaction cores and the at least one LUT, and configured to:
   receive a fault indication and a first domain identifier of the plurality of domain identifiers in response to occurrence of a first fault associated with a first application of the plurality of applications; and
   select from the plurality of reaction cores, a first reaction core mapped to the first domain identifier in the at least one LUT, and from the set of reaction combinations, a first reaction combination mapped to the first fault in the at least one LUT, wherein the selected first reaction core is configured to:
    respond to the fault indication with a reaction based on the selected reaction combination.

2. The SoC of claim 1, further comprising:
 at least one resource coupled to the fault collection and reaction system and the plurality of processor cores, wherein the execution of the plurality of applications comprises a plurality of transactions between the at least one resource and the plurality of processor cores, and wherein the first fault occurs based on at least one of a failure of a first transaction associated with the first application and a failure of an operation of the at least one resource subsequent to the first transaction.

3. The SoC of claim 1, wherein the first reaction core comprises:
a set of immediate reaction LUTs, wherein each of the set of immediate reaction LUTs is configured to store therein an immediate reaction configuration corresponding to at least one of the plurality of faults; and
a set of delayed reaction LUTs, wherein each of the set of delayed reaction LUTs is configured to store therein a delayed reaction configuration corresponding to at least one of the plurality of faults.

4. The SoC of claim 3, wherein the controller is further configured to:
generate a first selection signal to indicate the selection of the first reaction core;
provide the first selection signal to the plurality of reaction cores, wherein based on the first selection signal, the first reaction core assigned to the first application and mapped to the first domain identifier is selected from the plurality of reaction cores to respond to the fault indication;
generate a second selection signal to indicate the selection of the first reaction combination; and
provide the second selection signal to the selected first reaction core.

5. The SoC of claim 4, wherein the set of immediate reaction LUTs and the set of delayed reaction LUTs are further configured to receive the second selection signal, and wherein based on the second selection signal, a first immediate reaction LUT and a first delayed reaction LUT corresponding to the first reaction combination are selected from the set of immediate reaction LUTs and the set of delayed reaction LUTs, respectively, to respond to the fault indication.

6. The SoC of claim 5, wherein the controller is further configured to generate a start signal based on the received fault indication, and a reset signal when the first fault is handled.

7. The SoC of claim 6, wherein the fault collection and reaction system further comprises:
a timer coupled to the controller and the plurality of reaction cores, and configured to:
receive the start signal from the controller;
run based on a timer value indicated by the start signal;
generate a time-out signal, wherein the time-out signal transitions from a first logic state to a second logic state when the timer times out;
receive the reset signal from the controller when the first fault is handled; and
reset to a default state based on the reset signal.

8. The SoC of claim 7, wherein the set of delayed reaction LUTs is further configured to receive the time-out signal, and wherein the first delayed reaction LUT selected based on the second selection signal is disabled when the time-out signal is at the first logic state and enabled when the time-out signal is at the second logic state.

9. The SoC of claim 7, wherein when the time-out signal is at the first logic state, the first immediate reaction LUT is configured to output the reaction based on a first immediate reaction configuration stored therein, and wherein when the time-out signal is at the second logic state, the first delayed reaction LUT is configured to output the reaction based on a first delayed reaction configuration stored therein.

10. A fault collection and reaction method for a system-on-chip (SoC), the fault collection and reaction method comprising:
storing, by at least one look-up table (LUT) of a fault collection and reaction system on the SoC, a first mapping between a plurality of reaction cores of the fault collection and reaction system and corresponding plurality of domain identifiers, and a second mapping between a plurality of faults and a set of reaction combinations, wherein the plurality of faults are associated with a plurality of applications executed by a plurality of processor cores on the SoC and each of the plurality of reaction cores is assigned to at least one of the plurality of applications;
receiving, by a controller of the fault collection and reaction system, a fault indication and a first domain identifier of the plurality of domain identifiers in response to occurrence of a first fault associated with a first application of the plurality of applications;
selecting, by the controller, from the plurality of reaction cores, a first reaction core mapped to the first domain identifier in the at least one LUT, and from the set of reaction combinations, a first reaction combination mapped to the first fault in the at least one LUT; and
responding, by the selected first reaction core, to the fault indication with a reaction based on the selected first reaction combination.

11. The fault collection and reaction method of claim 10, wherein the first fault occurs based on at least one of a failure in the execution of the first application and a failure of an operation performed by a resource on the SoC in response to the execution of the first application.

12. The fault collection and reaction method of claim 10, further comprising:
generating, by the controller, a first selection signal to indicate the selection of the first reaction core;
providing, by the controller to the plurality of reaction cores, the first selection signal, wherein based on the first selection signal, the first reaction core assigned to the first application and mapped to the first domain identifier is selected from the plurality of reaction cores for responding to the fault indication;
generating, by the controller, a second selection signal to indicate the selection of the first reaction combination; and
providing, by the controller, the second selection signal to the selected first reaction core.

13. The fault collection and reaction method of claim 12, further comprising:
storing, by each of a set of immediate reaction LUTs of the first reaction core, an immediate reaction configuration corresponding to at least one of the plurality of faults; and
storing, by each of a set of delayed reaction LUTs of the first reaction core, a delayed reaction configuration corresponding to least one of the plurality of faults.

14. The fault collection and reaction method of claim 13, further comprising receiving, by the set of immediate reaction LUTs and the set of delayed reaction LUTs, the second selection signal, wherein based on the second selection signal, a first immediate reaction LUT and a first delayed reaction LUT associated with the first reaction combination are selected from the set of immediate reaction LUTs and the set of delayed reaction LUTs, respectively, for responding to the fault indication.

15. The fault collection and reaction method of claim 14, further comprising:
generating, by the controller, a start signal based on the received fault indication and a reset signal when the first fault is handled, wherein the start signal indicates a timer value associated with the first fault;
receiving, by a timer of the fault collection and reaction system, the start signal from the controller;
generating, by the timer, a time-out signal, wherein the time-out signal transitions from a first logic state to a second logic state when the timer times out;
receiving, by the timer, the reset signal from the controller; and
resetting, by the timer, to a default state based on the reset signal.

16. The fault collection and reaction method of claim 15, further comprising receiving, by the set of delayed reaction LUTs, the time-out signal, wherein the first delayed reaction LUT, selected based on the second selection signal, is disabled when the time-out signal is at the first logic state and enabled when the time-out signal is at the second logic state.

17. The fault collection and reaction method of claim 15, further comprising outputting, by at least one of the first immediate reaction LUT and the first delayed reaction LUT, the reaction for responding to the fault indication, wherein when the time-out signal is at the first logic state, the reaction is outputted by the first immediate reaction LUT based on a first immediate reaction configuration stored therein, and wherein when the time-out signal is at the second logic state, the reaction is outputted by the first delayed reaction LUT based on a first delayed reaction configuration stored therein.

18. A fault collection and reaction system for a system-on-chip (SoC), wherein the SoC comprises a plurality of processor cores coupled to the fault collection and reaction system, the fault collection and reaction system comprising:
a plurality of reaction cores each assigned to at least one of the plurality of applications;
at least one look-up-table (LUT) configured to store a first mapping between the plurality of reaction cores and corresponding plurality of domain identifiers, and a second mapping between a plurality of faults associated with the plurality of applications and a set of reaction combinations; and
a controller coupled to the plurality of reaction cores and the at least one LUT, and configured to:
receive a fault indication and a first domain identifier of the plurality of domain identifiers in response to occurrence of a first fault that is associated with a first application of the plurality of applications; and
select from the plurality of reaction cores, a first reaction core mapped to the first domain identifier in the at least one LUT, and from the set of reaction combinations, a first reaction combination mapped to the first fault in the at least one LUT, wherein the selected first reaction core is configured to:
respond to the fault indication with a reaction based on the selected reaction combination.

19. The fault collection and reaction system of claim 18, wherein the first reaction core comprises:
a set of immediate reaction LUTs, wherein each of the set of immediate reaction LUTs is configured to store therein an immediate reaction configuration corresponding to at least one of the plurality of faults; and
a set of delayed reaction LUTs, wherein each of the set of delayed reaction LUTs is configured to store therein a delayed reaction configuration corresponding to at least one of the plurality of faults.

20. The fault collection and reaction system of claim 19, wherein based on the second mapping, a first immediate reaction LUT and a first delayed reaction LUT are selected from the set of immediate reaction LUTs and the set of delayed reaction LUTs, respectively, to respond to the fault indication with the reaction.

* * * * *